United States Patent
Kotzin

(10) Patent No.: US 6,954,649 B2
(45) Date of Patent: Oct. 11, 2005

(54) METHOD AND DEVICE FOR CHOOSING A SYSTEM SELECTION ALGORITHM THAT IS LOCATION DEPENDENT

(75) Inventor: Michael D. Kotzin, Buffalo Grove, IL (US)

(73) Assignee: Motorola, Inc, Schaumburg, IL (US)

( * ) Notice: Subject to any disclaimer, the term of this patent is extended or adjusted under 35 U.S.C. 154(b) by 276 days.

(21) Appl. No.: 10/317,529

(22) Filed: Dec. 12, 2002

(65) Prior Publication Data

US 2004/0203893 A1 Oct. 14, 2004

(51) Int. Cl.[7] .......................... H04M 3/42; H04Q 7/20
(52) U.S. Cl. ................. 455/456.1; 455/435.2; 455/552.1
(58) Field of Search .................. 455/456.1, 456.2, 455/456.3, 456.6, 457, 435.1, 435.2, 414.1, 455/432.1, 433, 552.1, 422.1

(56) References Cited

U.S. PATENT DOCUMENTS

| | | | |
|---|---|---|---|
| 6,233,463 B1 * | 5/2001 | Wiedeman et al. ...... | 455/552.1 |
| 6,324,404 B1 | 11/2001 | Dennison et al. ........... | 455/456 |
| 6,397,040 B1 * | 5/2002 | Titmuss et al. ........... | 455/67.11 |
| 6,424,840 B1 * | 7/2002 | Fitch et al. .............. | 455/456.1 |
| 6,516,190 B1 * | 2/2003 | Linkola ................. | 455/408 |
| 6,684,082 B1 * | 1/2004 | McClure .................. | 455/552.1 |
| 6,748,217 B1 * | 6/2004 | Hunzinger et al. ...... | 455/435.2 |
| 6,766,169 B2 * | 7/2004 | Cooper .................... | 455/435.2 |

FOREIGN PATENT DOCUMENTS

| | | | | |
|---|---|---|---|---|
| WO | WO 01/47316 A2 | 6/2001 | ............ | H04Q 7/38 |
| WO | WO 01/50788 A1 | 7/2001 | ............ | H04Q 7/20 |

* cited by examiner

Primary Examiner—William Trost
Assistant Examiner—Brandon J. Miller
(74) Attorney, Agent, or Firm—Charles W. Bethards

(57) ABSTRACT

A wireless communications unit 200, and corresponding method within, is arranged and constructed for choosing a system selection algorithm that is used for selecting a system to provide services for the communications unit and comprises: means for associating a location with the wireless communications unit 223 215; a controller 209 for choosing a system selection algorithm from a plurality of such algorithms based on the location, where the chosen algorithm includes scan parameters (FIG. 3) that vary with the location; and a receiver 205 controllable by the controller according to the chosen algorithm to search for a system to provide service for the wireless communications unit.

22 Claims, 3 Drawing Sheets

| | SSA$_1$ /303 | SSA$_2$ /305 | SSA$_3$ /307 |
|---|---|---|---|
| 309 — GEOGRAPHICAL AREA | 101 | 103 | 101 |
| SYSTEM A (ACCESS TECH) | X | X | X |
| 311 — FREQUENCYS | $F_A$... | $F_A$... | — |
| ACQ. PARAMETERS | | | |
|   SCAN SS, DWELL TIME | $S_1, t_1$ | $S_2, t_2$ | |
|   CAMPING SS | | $d_2$ | |
|   RESCAN SS AND PERIOD | $d_1, 0$ | $d_2, t_3$ | |
| SERVICES | VOICE | VOICE & DATA, ETC | |
| SYSTEM B(B') (ACCESS TECH) | X | Y | X |
| FREQUENCYS | $F_B$... | $F_{B'}$... | $F$... |
| ACQ. PARAMETERS | | | |
|   SCAN SS, DWELL TIME | $S_4, t_4$ | $S_5, t_6$ | $S_6, t_7$ |
|   CAMPING SS | $d_4$ | $d_6$ | |
|   RESCAN SS AND PERIOD | $d_5, t_5$ | $d_7, t_7$ | $d_8, 0$ |
| SERVICES | VOICE & DATA | VOICE | VOICE & DATA |
| SYSTEM C (ACCESS TECH) | Y | Y | Y |
| FREQUENCYS | $F_C$... | $F_C$... | $F_C$... |
| ACQ. PARAMETERS | | | |
|   ⋮ | | | |
| SERVICES | | VOICE & DATA | VOICE & DATA |
| SYSTEM D (ACCESS TECH) | — | Z | — |
| ⋮ | | | |

300

*FIG. 3*

METHOD AND DEVICE FOR CHOOSING A SYSTEM SELECTION ALGORITHM THAT IS LOCATION DEPENDENT

FIELD OF THE INVENTION

This invention relates in general to communication equipment, and more specifically to a method and device for choosing a system selection algorithm that is dependent on the device location.

BACKGROUND OF THE INVENTION

Communications systems and equipment are known. Systems provided by many different carriers operating according to many different access technologies on many different frequencies have become available and deployed. In many areas multiple systems are available to provide services for a wireless communications unit or subscriber unit. The systems that are available within a given area may change over time.

When a wireless communications unit is activated or powered up or enters a new area the unit typically uses a system selection algorithm to locate or select a system and attempt to access that system. The system selection algorithm is used to search for a system, specifically tune the unit to various frequencies and determine whether an expected or compatible signal is present e.g. can be received. Finding the correct signal, thus system, can be a time consuming and thus power consuming task given the proliferation of differing systems.

Practitioners have devoted significant efforts to improving a system selection algorithm including various priority schemes that may improve the chances of finding the proper system but are still time and power consuming approaches. Others have used location information to assist with call management decisions including choosing a cell site, frequency, or perhaps cellular system. This may provide some benefit provided the communications systems that are available are known on an apriori basis and so long as the available systems do not change.

Clearly a need exists for apparatus and methods that can quickly and efficiently locate and select the proper system to provide service to wireless communications units.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 depicts a plurality of differing system selection algorithms with differing scan parameters.

DETAILED DESCRIPTION OF PREFERRED EMBODIMENTS

Figure 1:
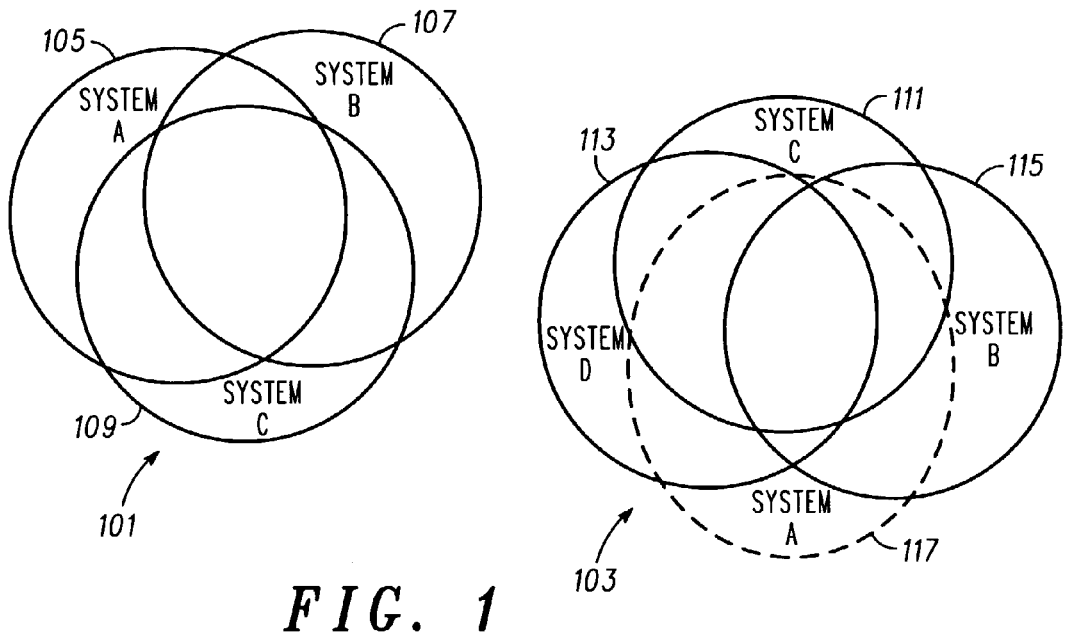
FIG. 1 depicts, a simplified and exemplary system diagram for setting the context within which the present invention operates.

In overview, the present disclosure concerns communications systems that provide services and specifically communications services such as cellular phone services to wireless communications units or subscriber units or devices and users thereof. More particularly various inventive concepts and principles embodied in apparatus and methods for providing or choosing a system selection algorithm at a subscriber or wireless communications unit are discussed and described. The communications systems and units of particular interest are those being deployed and developed commonly known as GSM (Group Special Mobile), GPRS (General Packet Radio System), IS-95 CDMA (Code Division Multiple Access), CDMA 2000, integrated digital enhanced network (IDEN), 2.5G or EDGE, and 3G or W-CDMA (Wideband CDMA) (UMTS) systems or variations and evolutions thereof that are suitable for providing services to wireless communications units. As further discussed below various inventive principles and combinations thereof are advantageously employed to choose or pick a system selection algorithm dependent upon location in a fashion that improves selection or scan times at the wireless communications unit, thus alleviating various problems, such as undue battery consumption associated with known approaches while still facilitating appropriate system selection, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1 a simplified and exemplary system diagram for setting the context within which the preferred embodiments operate will be discussed and described. FIG. 1 shows two distinct geographical areas 101, 103. It is understood that additional areas are available in the actual environment. Perhaps each geographical area represents a different metropolitan region, such as New York, London, or Dallas. Within each geographical area there are a plurality of systems, where a particular service provider or carrier may operate each system. Geographical area 101 includes system A 105, system B 107 and system C 109. Geographical area 103 includes system C 111, system D 113 and system B' 115. Additionally system A 117 is shown with a dotted line to signify that this system will become available in geographical area 103 in the near future. System B' 115 is intended to represent a system affiliated with and having cross billing agreements with System B. It is understood that many additional systems (not depicted) may be available in many metropolitan areas.

Each of these systems 105–109 provides services to appropriately equipped wireless communications units within a service area generally identified by the corresponding perimeter lines. Similarly each of the systems 111–113 provide services to appropriately equipped wireless communications units within a service area generally identified by the corresponding perimeter lines. The service areas in respective geographical areas 101, 102 overlap in total or in part as shown implying that service may be available from a plurality of systems for any one wireless communications unit over much or all of a geographical area. Furthermore, each system may have varying coverage capability across the depicted geographic area. For example, one system might be better equipped than another to handle in-building calls in certain portions of the, respective, service area due, for example, to specific or preferred placements of cells.

The catch is that a wireless communications unit must look or scan for the appropriate system in order to access it. Generally, scanning for the proper system amounts to the wireless communications unit tuning a receiver to one or more appropriate system specific frequencies and looking for or attempting to receive system specific characteristics, such as type of modulation and other signaling characteristics that will depend on the access technology, such as TDMA, CDMA, FDMA and variants thereof that are used by a system not to mention system identifiers and other information that must be decoded all as generally known.

This is complicated by the availability of different systems in different geographical areas as well as different frequencies for different geographical areas for the same system or carrier. Furthermore, there are many reasons why a given user, thus wireless communications unit may prefer one system over another. For example, different tariff rates or charges may apply to services on different systems. For example, a home system or a system affiliated with a home system may offer better pricing than other systems. Different systems may offer different services, such a voice only, voice and data, Internet or other packet data connections, or other wideband services and the like. It has proven difficult to develop a single system selection algorithm that is efficient in terms of time and power consumption to deal with the variations that may be experienced between different geographical areas or even within a given area since all carriers may not provide coverage or uniform coverage throughout an area. The present invention discusses an advantageous solution that associates or uses location of a wireless communications unit to choose or select a system selection algorithm that is optimized for the unit's needs at or near a given location.

Figure 2:
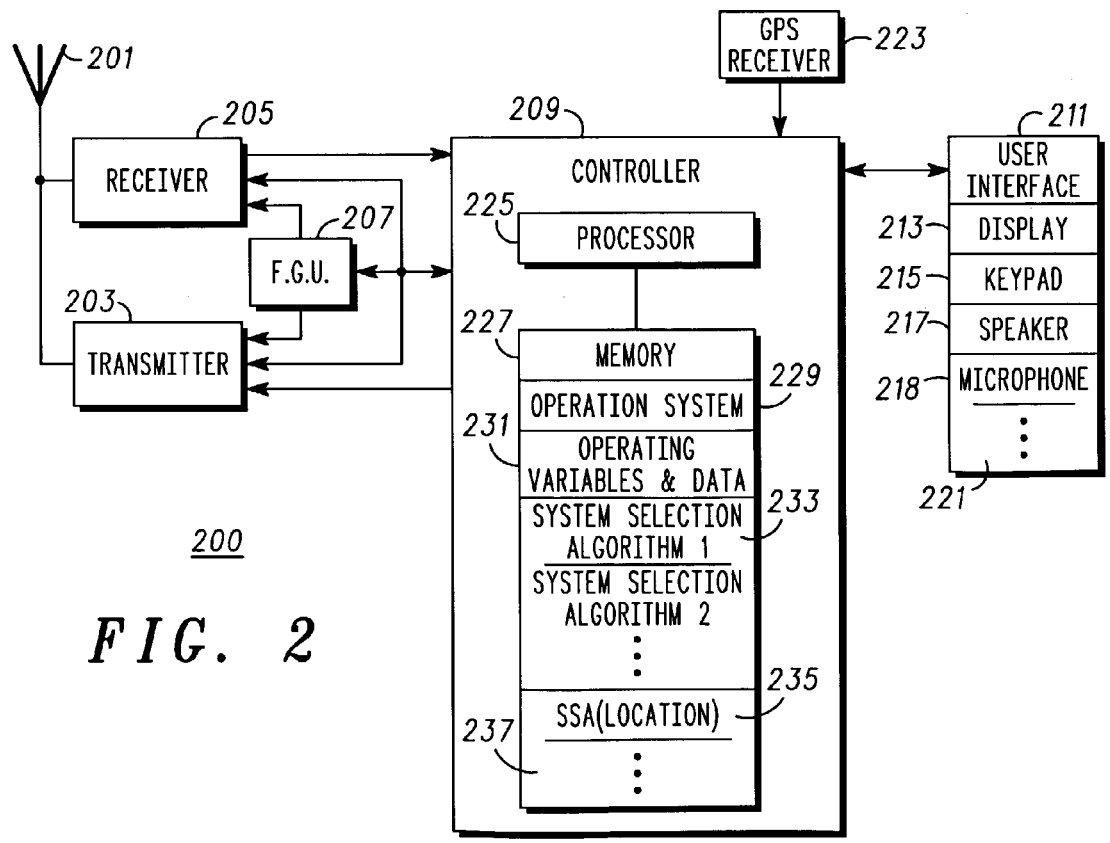
FIG. 2 depicts a block diagram of a preferred embodiment of a wireless communications unit.

Referring to FIG. 2, a basic block diagram of a preferred embodiment of a wireless communications unit will be discussed and described. This wireless communications unit block diagram is similar to most cellular phones or handsets such as those available from various manufacturers, such as Motorola, except for the additional and inventive elements and processes herein described. The functions of many of the blocks are similarly known and will not be dwelled upon. Wireless communications units that are able to utilize multiple access technologies may have relatively more complicated functional blocks but these are also known. Generally, the block diagram of FIG. 2 depicts a wireless communications unit 200 that is arranged and constructed for, among other communications functions, choosing a system selection algorithm where the system selection algorithm that is chosen is dependent on location of the unit and is used for selecting a system to provide service for the wireless communications unit.

As depicted, the communications unit includes an antenna structure 201 that may be tunable to one or more frequency bands for radiating radio frequency signals from a transmitter 203 and absorbing or receiving radio frequency signals for a receiver 205. The receiver and transmitter are each coupled to a frequency generation unit (FGU) 207 that includes for example one or more known frequency synthesizers that generate signals with frequencies that determine what frequency the receiver is tuned to or what frequency the transmitter transmits on. The FGU 207, receiver 205 and transmitter 207 are inter coupled to a controller 209 (controller and signal processor) by a control signal bus. Additionally the receiver provides a received or base band signal to the controller for received signal processing or decoding and a transmit base band signal is provided by the controller to the transmitter for transmission as required. The controller 209 operates to control the FGU, transmitter, and receiver and provide proper signals to and from the transceiver.

The controller 209 is also inter coupled to a user interface 211 that includes, for example, a display 213, a keyboard 215, a speaker 217 or earpiece, a microphone 219, and other user interface devices 221 such as a vibratory alert apparatus all generally known. These elements operate as generally known to provide control and utility to a user of the communications unit. The user interface will support, via the display and keyboard, user discretionary decisions and inputs as further noted below. The controller may also be coupled to a Geo-synchronous Positioning Satellite (GPS) receiver 223 as one means for associating a location with the wireless communications unit.

In any event the controller 209 comprises a processor 225 that is preferably one or more microprocessors and digital signal processors suitable to perform the control and signal processing functions of the wireless communications unit. The controller further comprises a memory 227, coupled to the processor, that is preferably a combination of RAM, ROM, EEPROM or magnetic based memory. The memory 227 stores software instructions and data that when executed and utilized by the processor results in the controller 209 controlling the wireless communications device and processing signals appropriately. The memory includes a basic operating system 229, operating variables and data 231, a plurality of system selection algorithms 233, a cross reference of system selection algorithms with location, SSA (location) 235, and various other routines 237 not specifically depicted such as a routine that supports over the air updating and configuring of system selection algorithms and parameters and routines required to control the wireless communications unit that are not here relevant but will be understood by one of ordinary skill.

Generally, the controller 209, specifically the processor executing the proper instructions or routines, when coupled to the means for associating a location, operates to choose one system selection algorithm from a plurality of system selection algorithms based on the location of the wireless communications unit to provide a chosen algorithm. The means for associating a location with the wireless communications unit can includes means for obtaining location parameters from either the GPS receiver 233, if available, or from a user of the wireless communications unit or other known means such as triangulation. For example the user via a pull down menu can select Chicago, New York, Chicago 1, or Chicago 2.

This information would be used as an input to the SSA (location) 235 routine which would point to the appropriate system selection algorithm 1, 2, ..., n 233.

The chosen algorithm may include system types, frequency bands, scan parameters, such as one or more of scan sensitivities, thresholds, timing parameters, etc. one or more of which will vary with the location or an algorithm structure that varies with the location. The algorithm structure includes variations in the flow or logic of the algorithm, such as search for the n frequencies or m frequencies with the strongest signals or search all frequencies associated with a system and then attempt to decode the signal starting with the strongest signal. The receiver 205 that is coupled to and controllable by the controller will be controlled to operate according to the chosen algorithm to search for a system to provide service for the wireless communications unit. Thus when a second location is associated with the wireless communications unit the controller provides a second chosen algorithm with scan parameters that correspond to the second location.

Preferably, the controller determines the chosen algorithm that is applicable at a particular location to correspond to either availability of differing systems or desirability of differing systems that may provide services at the particular location.

For example system D 113 and B' 115 are not available at geographic area 101. The desirability of the differing systems, meaning one system being more desirable than another, may be based on access technology capabilities of the wireless communications unit. For example, a unit capable of analog operation and IS-95 CDMA at 800 MHz or 1.6 GHz may prefer to operate at 1.6 GHz if a system is available. The desirability or relative desirability of the differing systems may as well be based on either tariff rates for the differing systems or specific services supported by the differing systems. Presumably the least expensive system would be preferred however if large of amounts of data are likely to be transferred then a more expensive system or at least one with appropriate services would be preferred.

The wireless communications unit, specifically the controller, may determine the chosen algorithm as either an algorithm that initially searches for a home system or an algorithm that foregoes a search for the home system. The plurality of system selection algorithms will preferably use one or more different system acquisition parameters to control scanning, camping, and rescanning attributes for the wireless communications unit. These differing system acquisition parameters may include one or more of a signal strength for acquisition, a signal strength for rescanning, a signal strength for camping, or a timing parameter for scanning, such as dwell time, rescan times or how often to rescan for another system and so forth.

Referring to FIG. 3, an exemplary table 300 depicting a plurality of differing system selection algorithms with differing scan parameters will be discussed and described. FIG. 3 shows three system selection algorithms, 303, 305, and 307 and a geographical area 309 where each is applicable. System selection algorithm 303 and 307 are applicable in geographical area 101 and system selection algorithm 305 is applicable in area 103. Generally, the information included in 309 together with 303–307 is the same as that is SSA (location) 235. The reason for two system selection algorithms associated with one geographical area, namely 101 is likely a tradeoff between tariff rates and services. Note that the table 300 is exemplary only and has been fashioned with ease of depiction and description in mind. For example, the various systems 311, system A, system B or B', system C, system D, etc are listed in order vertically along the left hand side of the Figure. Generally, the algorithm is expected to be executed from top to bottom, meaning with this depiction the systems are searched for from A to D, etc. In practice, this is not generally the case and the systems may be searched for in any desired order. Additionally not specifically shown is an algorithm structure or flow or logic that may vary from algorithm to algorithm, where the structure specifies the mechanics or logic of the search, such as how many signals and what signal characteristics will be searched. Nevertheless, the structure as depicted is suitable for explaining the general principles, content, and concepts embodied in a system search algorithm. System selection algorithm 303 is designed for a wireless communications unit to search for and is biased in favor of selecting system A with access technology X, such as TDMA, CDMA, etc. Generally, the wireless communications unit will scan the frequency list for system A, specifically $F_A$ ... using system acquisition parameters or attributes including scan parameters, such as a sensitivity or scan signal strength of $s_1$ and dwell time on each channel of $t_1$. After selection and access, if the signal strength on the channel drops by an amount $d_1$ (for a period of time that may also be a parameter) e.g. to a rescan signal strength, a rescan will occur using the same system selection algorithm. The signal strength values may as well be replaced by another indicia of channel quality such as bit error rates or frame error rates or the like. The specific values for signal strength, dwell times, and rescan signal strengths will depend on the access technology and system designs and will normally be known to those of ordinary skill else may be experimentally determined. Presumably, the bias toward system A is due to favorable tariff rates for appropriate services, here Voice services only, such as may be available if system A is the home system for the wireless communications unit.

Note that when the search for system A is not successful on an initial scan or on a rescan, a search for system B will occur using the frequency list for system B, $F_B$ ... and system acquisition parameters and scan parameters including a scan signal strength S4, dwell time $t_4$, a camping signal strength or variation or delta from the scanning signal strength $d_4$, a rescan signal strength as well as rescan timing parameter of time period $t_5$. In this instance if the signal strength deteriorates by an amount $d_4$ then every $t_5$ seconds a rescan will occur or by an amount $d_5$ then immediately a rescan will occur. Again the bias is to rescan and reselect or get back to system A. Note that expanded services are available, specifically voice and data, if system B is acquired or selected. An analogous situation holds for system C if system A and B can not be accessed. In area 101 system D is not available and will not be searched for with the first system selection algorithm 303. Note that if expanded services, such as voice and data and the like are desired by the user of the wireless communications unit then system selection algorithm 307 may be used to locate or search for and select system B or system C. This may be done with a pull down menu for the user that shows different combinations of service and allows the user to select the desired one.

Suppose the wireless communications unit travels to the geographical area 103. In this instance, the system selection algorithm 305 should be used given the location as noted above. Here, the preferred system A 117 is not or may not yet be operational. Since it is not known when it will go operational the system selection algorithm accounts for the possibility and scans a frequency list that may be different than the list in area 101 and may be an abbreviated list. Also, the system acquisition parameters including other scan parameters may vary from those used in system selection algorithm 303. For example, the scan sensitivity or signal strength s2 may be larger or the dwell time t2 may be shorter than the corresponding values for the algorithm 303. Furthermore, the camping signal strength is specified, and the rescan signal strength may be different and rescan timing parameter or time period is specified. Note that system A, if located, is expected to have expanded services in area 103 relative to 101. In any event, if system A is not located then system B' will be searched for or accessed. Note that system B' has a different access technology and fewer services than system B. System B' may be a system that is affiliated with system B by virtue of some agreement between carriers for the two systems.

The unit supplier or service provider, in view of the user's desires and other circumstances, may program the specific system selection algorithms into the wireless communications unit. Present device, terminal, or unit management techniques allow updating and reconfiguration of the devices over the air. Alternatively, an algorithm programming utility may be provided such that the user can program the algorithms. This is preferably arranged to be a menu driven routine where the user selects an access technology and low, medium, or high values for relative system preference or desirability, plus desired services information. Reasonable values for signal strengths and scanning timing parameters can be established from these minimal inputs in order to generate practical system selection algorithms that will normally find the proper system and at the same time be reasonable time and power efficient.

Figure 4:
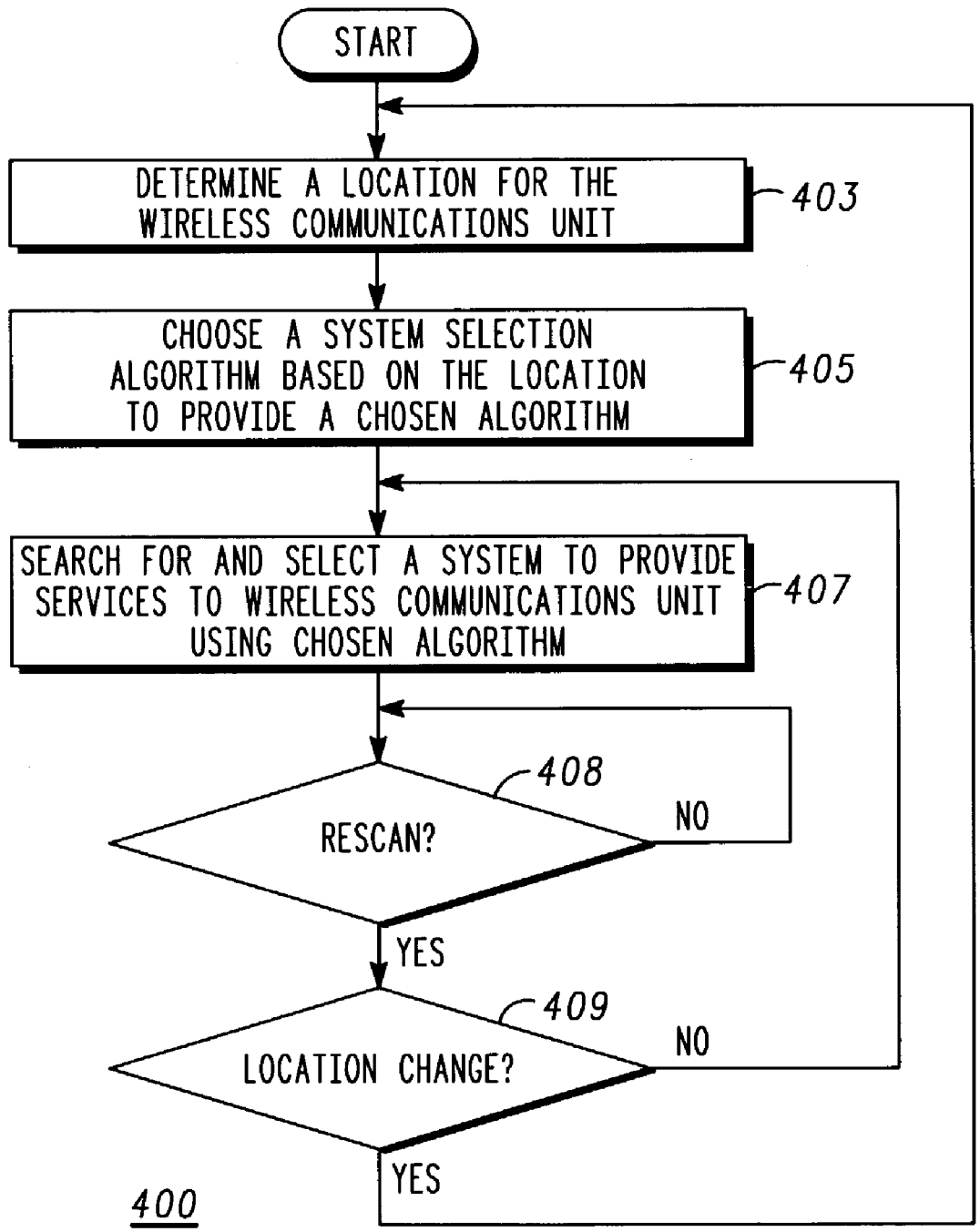
FIG. 4 illustrates a flow chart of a preferred method embodiment of choosing a system selection algorithm.

Referring to FIG. 4 a flow chart of a preferred method embodiment of choosing a system selection algorithm will be discussed and described. Much of this discussion will be in the nature of a review as many of the concepts and principles have been discussed above. FIG. 4 shows a method 400 in a wireless communications unit of choosing a system selection algorithm, where the system selection algorithm is used in selecting a system to provide service for the wireless communications unit. The method begins at 403 by determining a location for or associating a location with the wireless communications unit. The determining a location for the wireless communications unit may include or be accomplished by obtaining location parameters from a GPS receiver or directly from a user of the wireless communications unit.

Then 405 indicates choosing one system selection algorithm from a plurality of system selection algorithms based on the location to provide a chosen algorithm. The chosen algorithm will include one or more scan parameters that vary with the location. The choosing one system selection algorithm may include choosing an algorithm, such as system selection algorithm 303, that initially searches for a home system or an algorithm, such as system selection algorithm 307, that foregoes a search for the home system or system A. Each of the plurality of system selection algorithms is expected to be applicable at a particular location and corresponds in one manner or another to either availability of differing systems or desirability of differing systems.

For example, the plurality of system selection algorithms may correspond to the desirability of the differing systems according to access technology capabilities of the wireless communications unit. For example if the wireless communications unit is not able to search for a receive signals with access technology Z, such as system D uses, that system or search parameters for that system would not show up in a system search algorithm for that wireless communications unit. The plurality of system selection algorithms may also correspond to the desirability of the differing systems according to or based on relative tariff rates for the differing systems or based on supported services, such as voice, data, video, Internet interconnect.

At any rate 407 shows, after having selected the algorithm, using the chosen algorithm to search for and select a system to provide service for the wireless communications unit. Note that each of the plurality of system selection algorithms may use differing system acquisition parameters to control one or more of initial acquisition, camping, and rescanning attributes for the wireless communications unit. As noted above with reference to FIG. 3, the different system acquisition parameters may include one or more of a signal strength for acquisition, a signal strength for rescanning, a signal strength for camping, and timing parameters for scanning. If the system is lost or a rescan parameter is satisfied as determined at 407, 409 determines whether the location has changed and if so the process begins again at 403 and if not, the process searches again at 407 using the same algorithm.

The processes and apparatus discussed above and the inventive principles thereof are intended to and will alleviate problems caused by prior art system selection algorithms. Using these principles of choosing an algorithm based on location information for the wireless communications unit will enable a user of a communications unit, such as a cellular handset to enjoy not only selection of the most desirable system but also performance benefits such as quicker and more appropriate system acquisition as well as longer battery life thus facilitating user satisfaction. It is expected that one of ordinary skill given the above described principles, concepts and examples will be able to implement other alternative procedures that are subscriber or wireless unit or system characteristic dependent and that will also offer or facilitate similar performance benefits. It is expected that the claims below cover most such alternatives.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a wireless communications unit of choosing a system selection algorithm, the system selection algorithm for use in selecting a system to provide service for the wireless communications unit, the method comprising:

determining a location for the wireless communications unit; and choosing one system selection algorithm from a plurality of system selection algorithms based on the location to provide a chosen algorithm, the chosen algorithm including one of a scan parameter that varies with the location and an algorithm structure that varies with the location.

2. The method of claim 1 further including, using the chosen algorithm to search for and select a system to provide service for the wireless communications unit.

3. The method of claim 1 wherein the choosing one system selection algorithm includes choosing one of an algorithm that initially searches for a home system and an algorithm that foregoes a search for the home system.

4. The method of claim 1 wherein, each of the plurality of system selection algorithms is applicable at a particular location and corresponds to one of availability of differing systems and desirability of differing systems.

5. The method of claim 4 wherein, one of the plurality of system selection algorithms corresponds to the desirability of the differing systems according to access technology capabilities of the wireless communications unit.

6. The method of claim 4 wherein, one of the plurality of system selection algorithms corresponds to the desirability of the differing systems according to one of tariff rates for the differing systems and specific services supported by the differing systems.

7. The method of claim 1 wherein, determining a location for the wireless communications unit further includes obtaining location parameters from one of a GPS receiver and a user of the wireless communications unit.

8. The method of claim 1 wherein the plurality of system selection algorithms use differing system acquisition parameters to control camping and rescanning attributes for the wireless communications unit.

9. The method of claim 8 wherein the differing system acquisition parameters include one of a signal strength for acquisition, a signal strength for rescanning, a signal strength for camping, and a timing parameter for scanning.

10. A wireless communications unit arranged and constructed for choosing a system selection algorithm, the system selection algorithm for selecting a system to provide service for the wireless communications unit, the wireless communications unit comprising:

means for associating a location with the wireless communications unit;

a controller, coupled to the means for associating a location, for choosing one system selection algorithm from a plurality of system selection algorithms based on the location to provide a chosen algorithm, the chosen algorithm including one of a scan parameter that varies with the location and an algorithm structure that varies with the location; and a receiver coupled to and controllable by the controller according to the chosen algorithm to search for a system to provide service for the wireless communications unit.

11. The wireless communications unit of claim 10 wherein the controller determines the chosen algorithm that is further applicable at a particular location and corresponds to one of availability of differing systems and desirability of differing systems.

12. The wireless communications unit of claim 11 wherein the controller further determines the chosen algorithm corresponding to the desirability of the differing systems based on access technology capabilities of the wireless communications unit.

13. The wireless communications unit of claim 11 wherein the controller further determines the chosen algorithm corresponding to the desirability of the differing systems based on one of tariff rates for the differing systems and specific services supported by the differing systems.

14. The wireless communications unit of claim 10 wherein the means for associating a location with the wireless communications unit further includes means for obtaining location parameters from one of a GPS receiver and a user of the wireless communications unit.

15. The wireless communications unit of claim 10 wherein the controller determines the chosen algorithm as one of an algorithm that initially searches for a home system and an algorithm that foregoes a search for the home system.

16. The wireless communications unit of claim 10 wherein the plurality of system selection algorithms use differing system acquisition parameters to control one of scanning, camping, and rescanning attributes for the wireless communications unit.

17. The wireless communications unit of claim 16 wherein the differing system acquisition parameters include one of a signal strength for acquisition, a signal strength for rescanning, a signal strength for camping, and a timing parameter for scanning.

18. A wireless communications unit arranged and constructed for using a system selection algorithm for selecting a system to provide service for the wireless communications unit, the wireless communications unit comprising:

means for associating a first location with the wireless communications unit;

a controller, coupled to the means for associating a first location, for determining a first system selection algorithm based on the first location to provide a first chosen algorithm including one of a scan parameter that varies with the location and an algorithm structure that varies with the location; and a receiver coupled to and controllable by the controller according to the first chosen algorithm to search for a system to provide service for the wireless communications unit;

wherein, when a second location is associated with the wireless communications unit the controller provides a second chosen algorithm with scan parameters that correspond to the second location.

19. The wireless communications unit of claim 18 wherein the controller determines the first chosen algorithm and the second chosen algorithm to correspond to one of availability and desirability of differing systems that provide services, respectively, at the first location and the second location.

20. The wireless communications unit of claim 18 wherein the controller further determines one of the first chosen algorithm and the second chosen algorithm corresponding to the desirability of the differing systems based on one of tariff rates for the differing systems and specific services supported by the differing systems.

21. The wireless communications unit of claim 18 wherein one of the first chosen algorithm and the second chosen algorithm use differing system acquisition parameters to control one of scanning, camping, and rescanning attributes for the wireless communications unit.

22. The wireless communications unit of claim 21 wherein the one of the first chosen algorithm and the second chosen algorithm include one of a signal strength for acquisition, a signal strength for rescanning, a signal strength for camping, and a timing parameter for scanning.

* * * * *